United States Patent [19]

Decker

[11] 4,205,454
[45] Jun. 3, 1980

[54] COMBINED DISTANCE AND GRADIENT GAUGING APPARATUS

[76] Inventor: Neil E. Decker, 3413 Wainwright Ave., Lansing, Mich. 48910

[21] Appl. No.: 14,916

[22] Filed: Feb. 26, 1979

Related U.S. Application Data

[63] Continuation-in-part of Ser. No. 884,839, Mar. 9, 1978.

[51] Int. Cl.² ............................................. G01C 9/28
[52] U.S. Cl. ........................................ 33/387; 33/374
[58] Field of Search ............................. 33/374–376, 33/379, 381, 385–387

[56] References Cited

U.S. PATENT DOCUMENTS

| | | | |
|---|---|---|---|
| 686,360 | 11/1901 | Smiddy et al. | 33/374 |
| 1,224,165 | 5/1917 | Hansen | 33/387 |
| 2,304,313 | 12/1942 | Misz | 33/386 |
| 3,104,477 | 9/1963 | Edwill | 33/374 |

*Primary Examiner*—Charles E. Phillips
*Attorney, Agent, or Firm*—J. Gibson Semmes

[57] ABSTRACT

A combined distance and gradient gauging device is disclosed, including a base member, and at least one arm member slideably connected with said base member for parallel longitudinal displacement between collapsed and fully extended positions relative thereto, respectively, characterized in that the arm member is manually displaceable between a plurality of predetermined longitudinally displaced intermediate positions, relative to the base member so that the remote end extremities of the base and arm members are spaced at corresponding predetermined gauge distances, respectively. A spring-biased detent member is connected with one end of the base member adjacent one longitudinal surface of the arm member for selective cooperation with one of a plurality of longitudinally spaced recesses contained in the adjacent longitudinal surface of the arm member, thereby to retain the arm member in a selected one of a number of predetermined incremental distance gauging positions between the collapsed and fully extended positions. Second arm and cooperating detent members may be provided to increase the distance gauging capabilities of the device. An adjustable gradient indicator is provided for indicating a plurality of angular orientations of the device, relative to a reference plane, for variable distance - angular measuring operations.

1 Claim, 9 Drawing Figures

4,205,454

COMBINED DISTANCE AND GRADIENT GAUGING APPARATUS

CROSS-REFERENCE TO RELATED APPLICATIONS

This is a continuation-in-part of application Ser. No. 884,839, filed on Mar. 9, 1978, entitled DISTANCE GAUGING APPARATUS, by the applicant herein.

BACKGROUND OF THE INVENTION

Combined level and dimension indicating devices are well known in the patented prior art as evidenced by the Keefauver U.S. Pat. Nos. 1,074,367 and 1,177,709; Hutchens Pat. No. 1,894,870; Sniddy Pat. No. 686,360; Edwill Pat. No. 3,104,477; Matoba Pat. No. 1,329,196; Updike Pat. No. 2,607,129.

While the prior devices normally operate quite satisfactorily, they generally possess the inherent drawback that adjustment of the components between different gauging positions is rather difficult and time consuming; furthermore, complex locking means are required to maintain the components in a desired relationship during the distance gauging operation. Thus, when it is desired to alternately gauge two different dimensions, it is necessary to release the adjustment means, align the members that a desired interval, and then tighten the adjustable means for each dimension to be gauged. These steps have proven to be tedious for the operator of the device and have resulted in inaccuracies in the dimension being gauged, particularly where the dimensions are standardized, such as in gauging the plumbing fixtures in kitchens, bathrooms, and the like. Furthermore, the versatility of the level indicating apparatus in these devices is limited either to an indication of only fixed orientations of the gauging apparatus, such as horizontal or vertical, or to an indication of plural angular orientations only upon recalibration for each such orientation.

The present invention was developed to overcome the above and other drawbacks of the prior distance measuring devices by providing a device having a base member and one or more slideable arm members which may be quickly and easily extended from the base member to predetermined standardized gauging intervals, whereby the remote end extremities of the arm members are spaced at corresponding predetermined gauge positions, respectively. The device further includes an adjustable gradient indicator which is easily precalibrated to a "zero" reference plane, such as a true horizontal level. Once so precalibrated, the gradient indicator enables measurement of not only the reference plane, but also a plurality of sloped surfaces, full extension of the arm members enhancing the accuracy of such measurements.

SUMMARY OF THE INVENTION

The present invention provides a combined distance and gradient gauging device having a base member, and superposed first and second arm members parallel to the lower surface of said base member and slidably connected with the opposite ends of said base member for longitudinal displacement between collapsed and fully extended positions relative thereto, the lengths of said arm members being generally equal to the length of the base member. First and second spring-biased detent members are connected with the opposite ends of the base member adjacent one of the longitudinal surfaces of each of said first and second arm members, respectively, for selective cooperation with one of a plurality of longitudinally spaced recesses contained in the respective longitudinal surfaces of the arm members. The first and second arm members are manually displaceable between a plurality of predetermined longitudinally displaced positions relative to the base member so that the remote end extremities of the arm members are spaced at corresponding predetermined gauge positions, respectively.

The invention further provides an adjustable gradient indicator which is coactively disposed relative to the base member of the distance gauging device to enable measurement of a plurality of sloped surfaces.

It is, accordingly, an object of this invention to provide a single device for easily, accurately, and concurrently measuring both distance and slope.

In one embodiment of the invention, the predetermined gauging intervals of the slideable arm members and the calibrations on the gradient indicator are specifically selected to correspond to state imposed construction code requirements for buildings which are to be accessible to the physically handicapped. Accordingly, it is another object of this invention to provide a single device enabling quick and accurate measurement of all such requirements by persons involved in designing, constructing, and inspecting such facilities.

BRIEF DESCRIPTION OF THE DRAWINGS

Other objects and advantages of the invention will become apparent from a study of the following specification when viewed in the light of the accompanying drawing, in which.

DESCRIPTION OF THE PREFERRED EMBODIMENT

Figure 1:
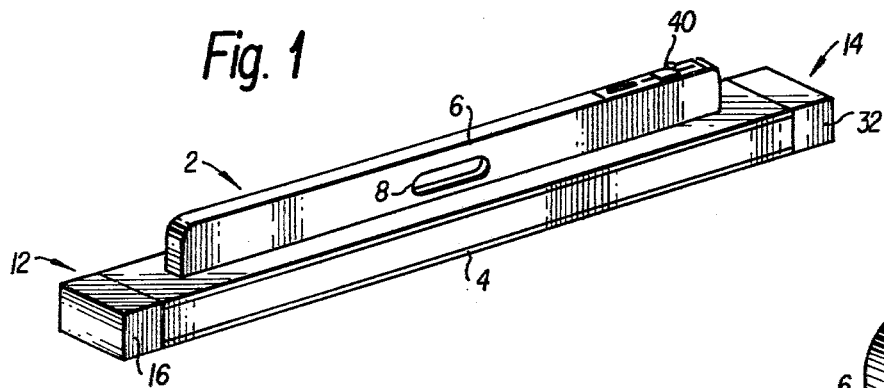
FIG. 1 is a perspective view of the invention.

Referring first to FIG. 1, the dimension gauging apparatus 2 includes a rectangular base member 4 to which is connected a parallel top member 6. The top member 6 includes a handle portion 8 and one adjustable gradient indicating device 10 in the upper surface thereof. Arranged at opposite ends of the base member 4 are the arm members 12 and 14.

Figure 2:
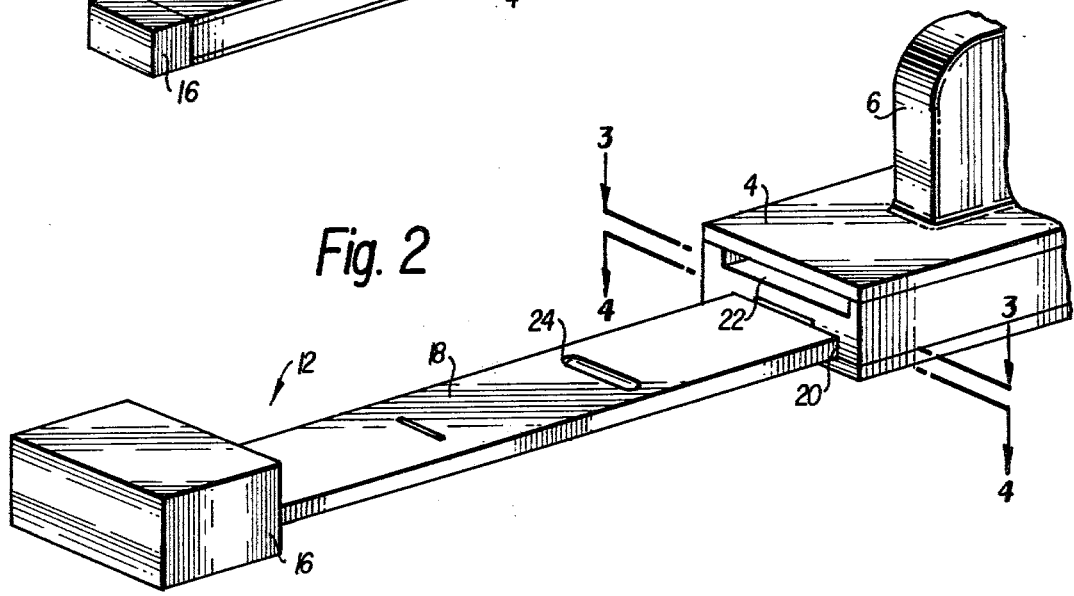
FIG. 2 is a partial perspective view of one end of the apparatus with one of the arm members partially extended.

As shown more particularly in FIG. 2, the first arm member 12 includes an end portion 16 having the same general rectangular configuration as the base member 4. The arm member longitudinal portion 18 is slidably connected with one end of the base member 4 by a longitudinal through slot 20 contained within the base member 4. The slot 20 permits longitudinal displacement of the arm member between a collapsed condition in which the longitudinal portion 18 is completely contained with the slot 20, and a fully extended condition. A second longitudinal through slot 22 in the base member 4 is arranged to receive the longitudinal portion 23 of the second arm member 14. The slots 20 and 22 are parallel and extend the length of the base member 4 so that when the arm members 12, 14 are in their collapsed positions, the arm member longitudinal portions are arranged in superimposed, spaced relation.

Figure 3:
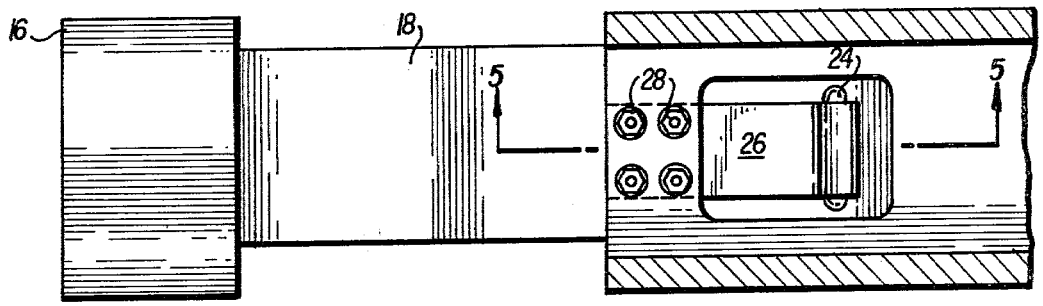
FIGS. 3 and 4 are detailed sectional views of invention taken along lines 3—3 and 4—4, respectively, of FIG. 2.
Figure 4:
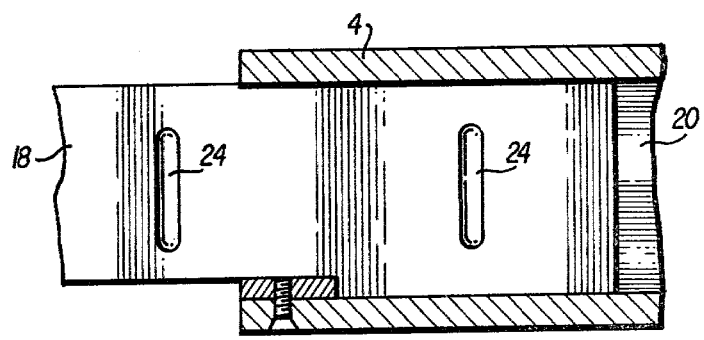
Figure 5:
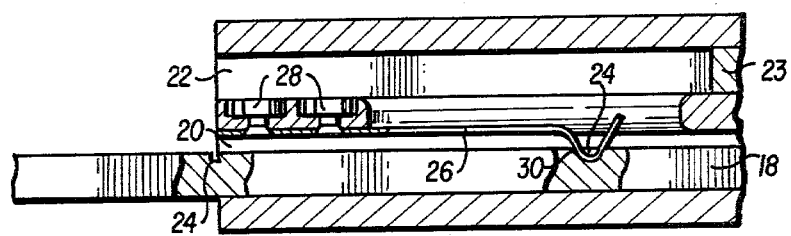
FIG. 5 is a detailed sectional view of invention taken along line 5—5 of FIG. 3.

Referring now to FIGS. 3 and 4, the longitudinal portion 18 of the arm member 12 includes on its upper surface a plurality of recesses 24. The recesses 24 are longitudinally spaced at predetermined intervals along the longitudinal portion 18. Connected at the end of the base member 4 from which the arm member 12 extends is a spring-biased detent member 26, shown more clearly in FIGS. 3 and 5. Fastening means 28, such as screws or studs, connect the spring-biased detent member 26 with the base member 4 above the slot 20. The detent member 26 has a protruding portion 30 which cooperates with a selected one of the recesses 24 in the arm member longitudinal portion 18 to retain the arm member 12 against longitudinal displacement within the slot 20.

Similarly, the second arm member 14 includes an enlarged end portion 32 and a longitudinal portion 23. The lower surface of the longitudinal portion 23 contains longitudinally spaced recesses at predetermined intervals (not shown) similar to the recesses 24 in the first arm longitudinal portion 18. Thus, the recesses are arranged in the adjacent surfaces of the longitudinal portions 18 and 23. A second spring-biased detent member (not shown) is arranged at the end of the base member from which the arm member 14 extends, the second detent member cooperating with the recesses on the lower longitudinal surface of the second arm member 14.

The dimension gauging apparatus may be used to gauge a predetermined distance by selectively positioning the arm members relative to the base member. Thus when a first dimension is to be gauged, the first arm member 12 is manually displaced outwardly from the slot 20 until the protruding portion 30 of the spring-biased detent member 26 engages the first of the plurality of recesses 24 arranged on the surface of the arm member longitudinal portion 18, thereby to restrain the arm member 12 against further longitudinal displacement. The distance between the remote extremities of the arm member end portion 16 and the collapsed second arm member end portion 32 corresponds with the first predetermined interval. The arm member may be further displaced outwardly toward selected positions associated with the succeeding recesses on the arm member longitudinal portion 18. When the first arm member is fully extended, the second arm member is then displaced in the same manner, each recess on the second arm member longitudinal portion 23 corresponding to a predetermined interval. It will be readily appreciated that the dimension gauging device may quickly be adjusted to a plurality of selected predetermined intervals. Furthermore, the intervals may be provided to correspond with standard dimensions suitable for the environment in which the gauging apparatus is used. In the preferred embodiment, these intervals are selected to correspond to state imposed construction code requirements for facilities which are to be accessible to the physically handicapped and in such a way as to provide measurement of all such standards.

The superimposed relation of the arm member longitudinal portions having recesses in the adjacent faces thereof provides a biasing torque at each of the spring-biased detent members upon the extension of the arm members. This torque aids the detent members in engaging the recesses on the arm members to restrain the displacement of the arm members relative to the base member when a desired predetermined interval has been selected. Furthermore, owing to the length of the arms relative to the length of the support member, the arms are guided by the slots during the relative separation of the arms during a distance gauging operation.

Figure 6:
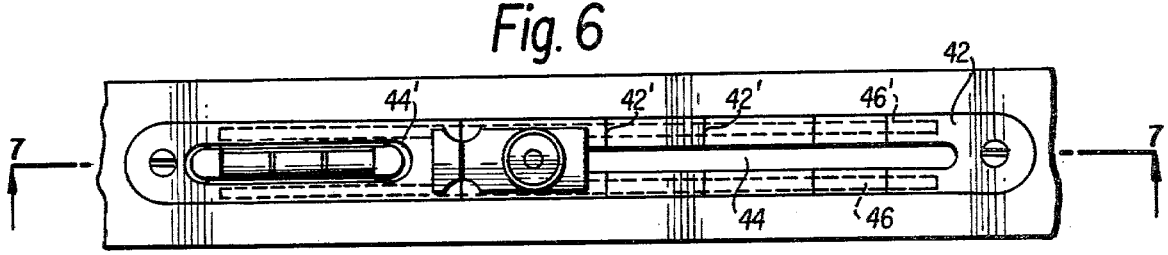
FIG. 6 is a partial top elevation of the present apparatus showing the disposition of the gradient indicator within the top member.

The adjustable gradient indicator 40 is shown more clearly in FIGS. 6 through 9. The indicator includes a gradient plate 42, having two longitudinal slots, 44 and 44', of unequal length and width, vertically cut therethrough. On the flat upper surface of the gradient plate, adjacent the longer and narrower slot 44, plural gradient calibrations 42' are marked at predetermined intervals corresponding to the desired slopes to be gauged. Two parallel flanges, 46 and 46' (not shown) of equal general rectangular configuration extend from the bottom surface of the gradient plate 42, and at right angles, respectively, thereto. As shown in FIG. 6, flanges 46 and 46' are positioned so that the inner surface of each flange is contiguous to the corresponding lateral edges of the shorter slot 44'.

Figure 8:
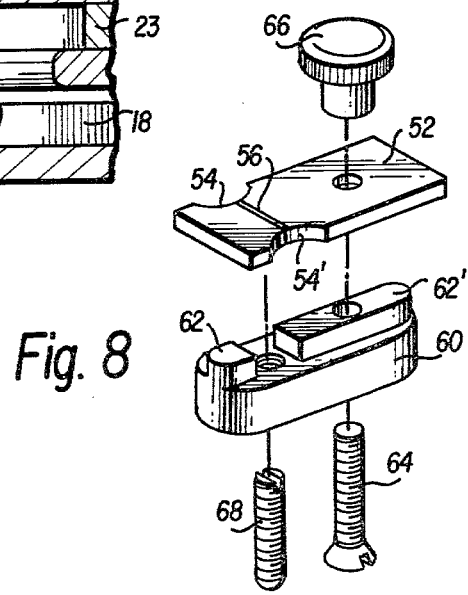
FIG. 8 is an exploded view in perspective of the FIG. 7 cursor base member assembly.

The gradient indicator further includes cursor 50, as shown more clearly in FIG. 8.

Figure 7:
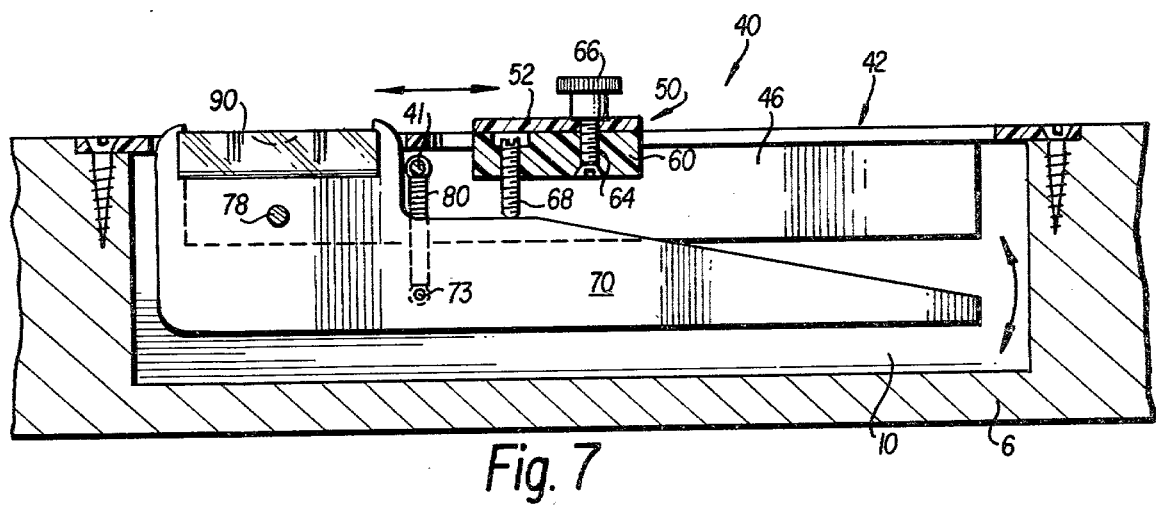
FIG. 7 is a detailed sectional view of the FIG. 6 gradient indicator taken along line 7—7 thereof.

Indicator plate 52 is slideably disposed upon the flat upper surface of gradient plate 42, adjacent lower slot 44. Alignment grooves 54 and 54' and index line 56 are provided for alignment with the gradient calibration 42' when, in operation, the indicator plate is displaced longitudinally on the upper surface of gradient plate 42. Tracking member 60, of general rectangular configuration, is provided with slot guides 62 and 62' whereby said tracking member is slideably disposed within the longer slot 44 of gradient plate 42. As shown in FIG. 7, locking screw 64 and adjusting nut 66 connect indicator plate 52 to tracking member 60 for tandem longitudinal displacement therewith.

Calibration screw 68 is moveably disposed vertically within tracking member 60, opposite and parallel to locking screw 64, the lower portion of said calibration screw extending beyond the lower surface of said tracking member, and the upper portion of said calibration screw extending above the upper surface of said tracking member. Rotation of adjusting nut 66 varies the frictional forces exerted upon the respective surfaces of the gradient plate 42 by the corresponding surfaces of the indicator plate 52 and tracking member 60 whereby the cursor 50 is displaced between, and fixed at, the predetermined intervals indicated by gradient calibrations 42'.

Figure 9:
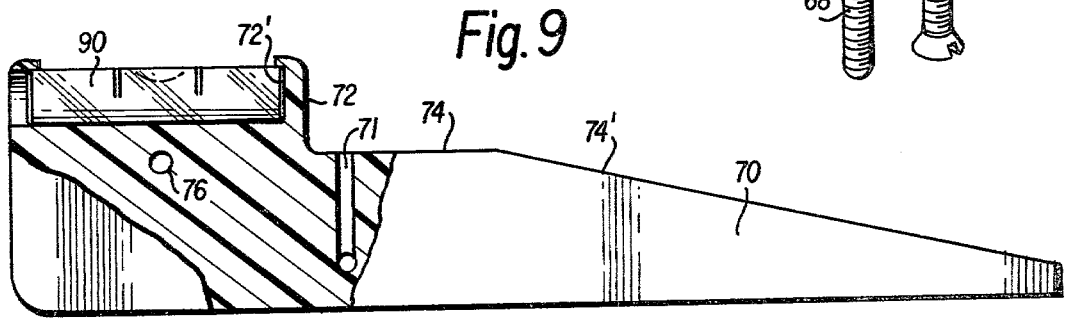
FIG. 9 is a side elevation view of the elevating arm, showing the disposition of the level vial therein.

As more clearly shown in FIG. 9, the rear portion of the elevating arm 70 includes a top extension 72, having a recess 72', wherein level vial 90 is disposed, the axis of the vial being parallel to the lower surface of the elevating arm 70. Adjacent the extension 72, the upper surface of the elevating arm 70 forms a calibration track 74, which is disposed parallel to the lower surface of the elevating arm. The upper surface of the forward part of the elevating arm 70 forms a sloped track 74' which is disposed at a critical angle, relative to the calibration track 74. Fulcrum hole 76 is drilled horizontally through the elevating arm 70 at the intersection of the plane defined by calibration track 74 with the vertical center line of the level vial. The elevating arm 70 is pivotally connected in parallel relation to the flanges, 46 and 46', by fulcrum screw 78, said elevating arm, having a lesser diameter than the distance between said flanges, being moveably disposed therebetween.

The angular disposition of the sloped track and the dimensions of the elevating arm are selected so that, in coaction with one another and with the cursor 50 and base member 4, angular orientations of the base member are transferred into direct ratios of slope corresponding to the predetermined intervals indicated by gradient calibrations 42'.

Bore 71, drilled vertically into the elevating arm, receives the lower end of tension spring 80, which is secured thereto by fastener 73. As shown in FIG. 7, the upper end of tension spring 80 is connected to the flanges, 46 and 46', by pin 41. When so connected, tension spring 80 provides continuous resilient contact between the lower tip of calibration screw 68 and calibration track 74 and slope track 74', respectively, as the cursor 50 is longitudinally displaced upon the gradient plate 42.

As also shown in FIG. 6, the gradient indicator 40 is disposed within a rectangular cavity 10 formed within top member 6, flanges 46 and 46' being in contact with the vertical front and rear surface thereof respectively, and gradient plate 42 being disposed parallel to the bottom surface of base member 4.

Providing the above described gradient indicator 40 is of the utmost significance in the present invention. As indicated hereinabove, the disadvantage in the prior art mainly consists of a slow and tedious method of calibrating the grade level bubble. For instance, in Hutchens, U.S. Pat. No. 1,894,870, calibration is accomplished by placing the device on a long straight edge, such as a ten foot board, which has been placed at one desired grade. An adjusting bolt is then turned until the device is set for that gradient. If a different gradient is desired, the entire calibrating steps must be repeated. Other known methods of measuring slope require the combined utilization of several devices, such as a transit, a surveyor's rod, and measuring tape, together with mathematical computation. Such methods often require the effort of several persons.

By contrast, the present invention provides a self-contained measuring device requiring only one operator, which is easily precalibrated for accuracy and which semi-automatically transfers vertical distances to ratios of slope. The gradient indicator is pre-calibrated by placing the bottom surface of base member 4 upon a known reference surface, such as a true horizontal level. The cursor 50 is then positioned at the zero (0—0) level as shown in FIG. 6. Adjustment nut 66 is loosened and indicator plate 52 is rotated horizontally, thus providing access to the calibrating screw 68. Said calibrating screw is then adjusted until the bubble is centered in level vial 90, providing a true and accurate zero level reading. Once so precalibrated, direct ratios of a plurality of slopes are automatically measured without further calibration as the cursor 50 is displaced upon the gradient plate 42, the lower tip of calibrating screw 68 traversing slope track 74. For maximum accuracy in gauging gradient, arm members 12 and 14 are preferably fully extended.

As above described, the instant invention is particularly useful to persons involved in designing, constructing, and inspecting facilities to be accessible to the physically handicapped. Where state imposed regulations prescribe construction code requirements pertaining to such features as approach walks, entrance ramps, handrails, drinking fountains, lavoratories, and countertops, the arm members 12 and 14, and gradient plate 42 of the present invention may be precalibrated so that all such requirements may be gauged with a single easily operated device.

While in accordance with the provisions of the Patent Statutes, the preferred form and embodiment of the invention has been illustrated, it will be apparent to those skilled in the art that various changes and modifications may be made without deviating from the invention concepts set forth above.

I claim:

1. Apparatus for gauging distances and a plurality of inclined surfaces comprising:
   A. a base member, having a lower surface, a projecting top member, and defining internally therein first and second longitudinal through slots, said slots being disposed parallel to said lower surface;
   B. superposed first and second arm members slideably disposed within said first and second through slots, respectively, for longitudinal displacement between collapsed and fully extended positions relative to opposite ends, respectively, of said base member, the length of said first and second arm members being generally equal to the length of said base member, said first and second arm members having a plurality of longitudinally spaced recesses within the upper and lower surfaces, respectively, thereof;
   C. first and second spring biased detent members connected adjacent opposite ends of the base member, said first and second spring biased detent members being disposed within said base member and adjacent the upper and lower surfaces, respectively, of the first and second arm members for selective engagement with one of said plurality of longitudinally spaced recesses container within said respective arm members, whereby each arm member may be manually displaced between, and fixed at, a plurality of predetermined longitudinally displaced positions, so that the remote end extremities of said first and second arm members are spaced at corresponding predetermined gauge positions relative to said base member, respectively, and relative to each other;
   D. adjustable gradient indicator mounted within the projecting top element of said base member, said gradient indicator having a gradient plate on the upper portion thereof, said gradient plate having plural gradient calibrations marked at predetermined intervals thereon, said gradient indicator further having parallel flanges extending perpendicularly from the lower surface of said gradient plate, said gradient indicator having an elevating arm, said elevating arm being disposed parallel to said flanges and having pivotal connection thereto for angular displacement relative to the lower surface of said base member, said elevating arm having a level vial disposed therein, said gradient indicator further having a cursor slideably disposed upon the upper surface of said gradient plate for longitudinal displacement between said plural gradient calibrations, said cursor having resilient coactive connection with said elevating arm, wherein that portion of the cursor having connection with the elevating arm forms a calibration screw, said calibration screw being movably disposed within said cursor, and wherein that portion of the elevating arm having connection with said calibration screw consists of a calibration track and a sloped track, said calibration track being adjacent said level vial and being disposed upon a plane perpendicular to the pivotal axis of said elevating arm and parallel to the axis of said level vial, said sloped track being disposed adjacent said calibration track at a critical angle relative to the axis of said level vial, whereby a plurality of angular orientations of the lower surface of said base member relative to a reference plane are gauged upon longitudinal displacement of said cursor and resultant angular displacement of said elevating arm and level vial.

* * * * *